US008730091B2

(12) United States Patent
Sathyendra et al.

(10) Patent No.: US 8,730,091 B2
(45) Date of Patent: May 20, 2014

(54) TARGET IDENTIFICATION FOR A RADAR IMAGE

(75) Inventors: Harsha Modur Sathyendra, McKinney, TX (US); Bryan D. Stephan, Van Alstyne, TX (US)

(73) Assignee: Raytheon Company, Waltham, MA (US)

( * ) Notice: Subject to any disclaimer, the term of this patent is extended or adjusted under 35 U.S.C. 154(b) by 342 days.

(21) Appl. No.: 13/104,243

(22) Filed: May 10, 2011

(65) Prior Publication Data

US 2012/0286989 A1 Nov. 15, 2012

(51) Int. Cl.
*G01S 7/41* (2006.01)
*G01S 13/90* (2006.01)

(52) U.S. Cl.
USPC ............................................ 342/90; 342/25 F

(58) Field of Classification Search
CPC ........... G01S 7/41; G01S 7/411; G01S 7/412; G01S 13/89; G01S 13/90; G01S 13/9035
USPC .................................................... 342/90, 25 F
See application file for complete search history.

(56) References Cited

U.S. PATENT DOCUMENTS

| | | | |
|---|---|---|---|
| 6,255,981 B1 | 7/2001 | Samaniego | |
| 6,259,396 B1 | 7/2001 | Pham et al. | |
| 6,337,654 B1 | 1/2002 | Richardson et al. | |
| 6,437,728 B1 * | 8/2002 | Richardson et al. | 342/90 |
| 6,687,577 B2 * | 2/2004 | Strumolo | 701/1 |
| 6,943,724 B1 | 9/2005 | Brace et al. | |
| 7,081,850 B2 | 7/2006 | Small | |
| 7,116,265 B2 | 10/2006 | Shu et al. | |
| 7,598,900 B2 | 10/2009 | Iverson | |
| 7,889,232 B2 | 2/2011 | Chew | |
| 8,063,815 B2 * | 11/2011 | Valo et al. | 342/25 R |
| 2006/0238406 A1 | 10/2006 | Nohara et al. | |
| 2010/0052977 A1 | 3/2010 | Sathyendra | |
| 2011/0210885 A1 * | 9/2011 | Lodwig et al. | 342/25 F |

OTHER PUBLICATIONS

Leonard E. Baum; An Inequality and Associated Maximization Technique in Statistical Estimation for Probabilistic Functions of Markov Processes; Inequalities; vol. 3; pp. 1-8; 1972.

Julien Epps; Wideband Extension of Narrowband Speech for Enhancement and Coding; School of Electrical Engineering and Telecommunications The University of New South Wales; Sep. 2000.

Debora Pastina and Chiara Spina; Multi-feature based automatic recognition of ship targets in ISAR images; IEEE; Proceedings IEEE Radar Conf.; 2008.

(Continued)

*Primary Examiner* — Matthew M Barker
(74) *Attorney, Agent, or Firm* — Burns & Levinson LLP; Joseph M. Maraia

(57) ABSTRACT

The target identification technology described herein includes a method, a system, and a computer program product. In some examples, the system includes a length estimation module configured to determine a length of a target from a radar image based on a range profile, the radar image, and one or more adaptive parameters. The system can include a points of interest module configured to identify at least one point of interest of the target from the radar image based on the length of the target, the range profile, the radar image, the one or more adaptive parameters, and Hough Line processing. The system can include an identification module configured to determine a target identification from a plurality of identification classes based on the length of the target and the at least one point of interest of the target.

12 Claims, 7 Drawing Sheets

(56) References Cited

OTHER PUBLICATIONS

Frank McFadden and Scott Musman; Rapid Estimation of Ship Length from ISAR Imagery; Office of Naval Research Presentation; 2000.

Shujun Zhang and Bir Bhanu; Automatic Model Construction for Object Recognition Using ISAR Images; IEEE; Proceedings IEEE 13th Int. Conf. of Pattern Recognition; pp. 169-173; 1996.

J.R. Epps and W.H. Holmes; Wideband Speech Coding at Narrowband Bit Rates; 8th Aust. Int. Conf. Speech Sci. & Tech.; pp. 398-403; 2000.

V. Zeljkovic, Q. Li, R. Vincelette, C. Tameze and F. Liu; Automatic algorithm for inverse synthetic aperture radar images recognition and classification; IET Radar Sonar Navig.; vol. 4, Iss. 1, pp. 96-109; 2010.

J. Manikandan, B. Venkataramani and M. Jayachandran; Evaluation of Edge Detection Techniques towards Implementation of Automatic Target Recognition; IEEE; International Conference on Computational Intelligence and Multimedia Applications; pp. 441-445; 2007.

Thomas Fechner and Ralf Tanger; A Hybrid Neural Network Architecture for Automatic Object Recognition; IEEE; Proceedings of IEEE Neural Networks for Signal Processing; pp. 187-194; 1994.

Vincent Wan and Steve Renals; Evaluation of Kernel Methods for Speaker Verification and Identification; pp. 669-672; 2002.

\* cited by examiner

TARGET IDENTIFICATION FOR A RADAR IMAGE

BACKGROUND

Automatic target recognition for radar images can be utilized for differentiating commercial and non-commercial targets (e.g., maritime vessels, aircraft, etc.); facilitating identification of targets on borders; and identifying friendly or foe targets. However, since there are many possible types of targets, it is challenging, if not impossible, to correctly identify all known targets. Further, previous attempts at target identification have utilized simulated data to train technology to identify targets. These previous attempts do not take into account issues with real-world radar images such as noise spikes, clutter returns, range and Doppler smearing, and atmospheric confrontations. Thus, a need exists in the art for improved target identification for a radar image.

SUMMARY

One approach provides a target identification system. The system includes a length estimation module configured to determine a length of a target from a radar image based on a range profile, the radar image, and one or more adaptive parameters; a points of interest module configured to identify at least one point of interest of the target from the radar image based on the length of the target, the range profile, the radar image, the one or more adaptive parameters, and Hough Line processing; and an identification module configured to determine a target identification from a plurality of identification classes based on the length of the target and the at least one point of interest of the target.

Another approach provides a method for target identification of a radar image. The method includes (a) determining a length of a target from a radar image based on a range profile, the radar image, and one or more adaptive parameters; (b) identifying at least one point of interest of the target from the radar image based on the length of the target, the range profile, the radar image, the one or more adaptive parameters, and Hough Line processing; and (c) determining a target identification from a plurality of identification classes based on the length of the target and the at least one point of interest of the target.

Another approach provides a computer program product. The computer program product is tangibly embodied in an information carrier. The computer program product includes instructions being operable to cause a data processing apparatus to: determine a length of a target from a radar image based on a range profile, the radar image, and one or more adaptive parameters; identify at least one point of interest of the target from the radar image based on the length of the target, the range profile, the radar image, the one or more adaptive parameters, and Hough Line processing; and determine a target identification from a plurality of identification classes based on the length of the target and the at least one point of interest of the target.

In other examples, any of the approaches above can include one or more of the following features.

In some examples, the system includes a dimension projection module configured to project 2-dimensional target features of the radar image onto a 1-dimensional target feature vector for the radar image; and the points of interest module further configured to determine at least one point of interest of the target from the radar image based on the length of the target, the range profile, the radar image, the one or more adaptive parameters, and Hough Line processing.

In other examples, the system includes a class training module configured to generate the plurality of identification classes based on a plurality of pre-identified radar images, each of the plurality of pre-identified radar images includes a pre-identified length and at least one pre-identified point of interest.

In some examples, the system includes a dimension projection module configured to project 2-dimensional target features of each of the plurality of pre-identified radar images into a 1-dimensional target feature vector for each of the plurality of pre-identified radar images.

In other examples, the target is a maritime object.

In some examples, the method includes the step (b) further includes: separating the radar image into at least two sections based on the length of the target; and identifying at least one point of interest of the target for at least one of the at least two sections from the radar image based on the range profile, the radar image, and the one or more adaptive parameters.

In other examples, the method includes repeating steps (a), (b), and (c) to determine other target identifications for successive frames of the plurality of radar images.

In some examples, the method includes isolating at least one horizontal or vertical line in the radar image utilizing the range profile and/or Hough line processing.

In other examples, the one or more adaptive parameters include an aspect angle parameter, a warping coefficient parameter, and/or a point of interest weight parameter.

In other examples, the radar image is an inverse synthetic aperture radar image.

The techniques described herein can provide one or more of the following advantages. An advantage of the technology is that the feature extraction of the target (e.g., length determination, points of interest identification, etc.) can winnow the possible identification classes, thereby increasing the efficiency of the technology and reducing mis-classifications of the target. Another advantage of the technology is that each identification class includes a set of classifier parameters (e.g., length, points of interest, etc.) that can be utilized to differentiate similar targets (e.g., targets of a similar length, targets with similar points of interest, etc.), thereby decreasing mis-classifications of the target and increasing the applicable uses of the technology. Another advantage of the technology is the use of selected identification classes based on the target environment, thereby increasing the correct target classification level by removing non-relevant identification classes for the target environment (e.g., 96% correct target identification level, 77% correct target identification level, etc.).

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Target identification for a radar image includes technology that, generally, classifies a target (e.g., maritime vessel, vehicle, aircraft, etc.) from identification classes based on the length of the target (e.g., 55 meters, 98 meters, etc.) and points of interest of the target (e.g., superstructure location, radio mast, reflector, etc.). The technology can advantageously increase identification accuracy by separating the target into sections and utilizing the points of interest within each section to classify the target, thereby increasing the accuracy rate by increasing the matching criteria for each class (e.g., from three matching points of interest over the entire target to one matching point of interest in each of the three sections, etc.). In other words, a target matching an identification class would not only need to match the points of interest for the identification class, but would also need to match the section splits and the respective points of interest within each section.

The technology classifies the target based on one or more radar images of the target (e.g., separate radar images, separate frames of a radar image, etc.), thereby advantageously decreasing mis-classification of the target by increasing the views of the target. The technology can generate the identification classes based on real-world radar data that is pre-identified and/or dynamically identified. The technology enables the identification classes to be selected based on the target identification environment that the technology is operating within, which advantageously increases the correct classification level by decreasing the number of identification classes that the technology attempts to match. For example, if the technology operates in a commercial fishing environment, the identification classes are limited to commercial fishing vessels (e.g., 20 commercial fishing vessel classes out of 2000 maritime vessel classes). In this example, any other target is classified as unknown and an operator can determine the target classification manually.

Figure 1:
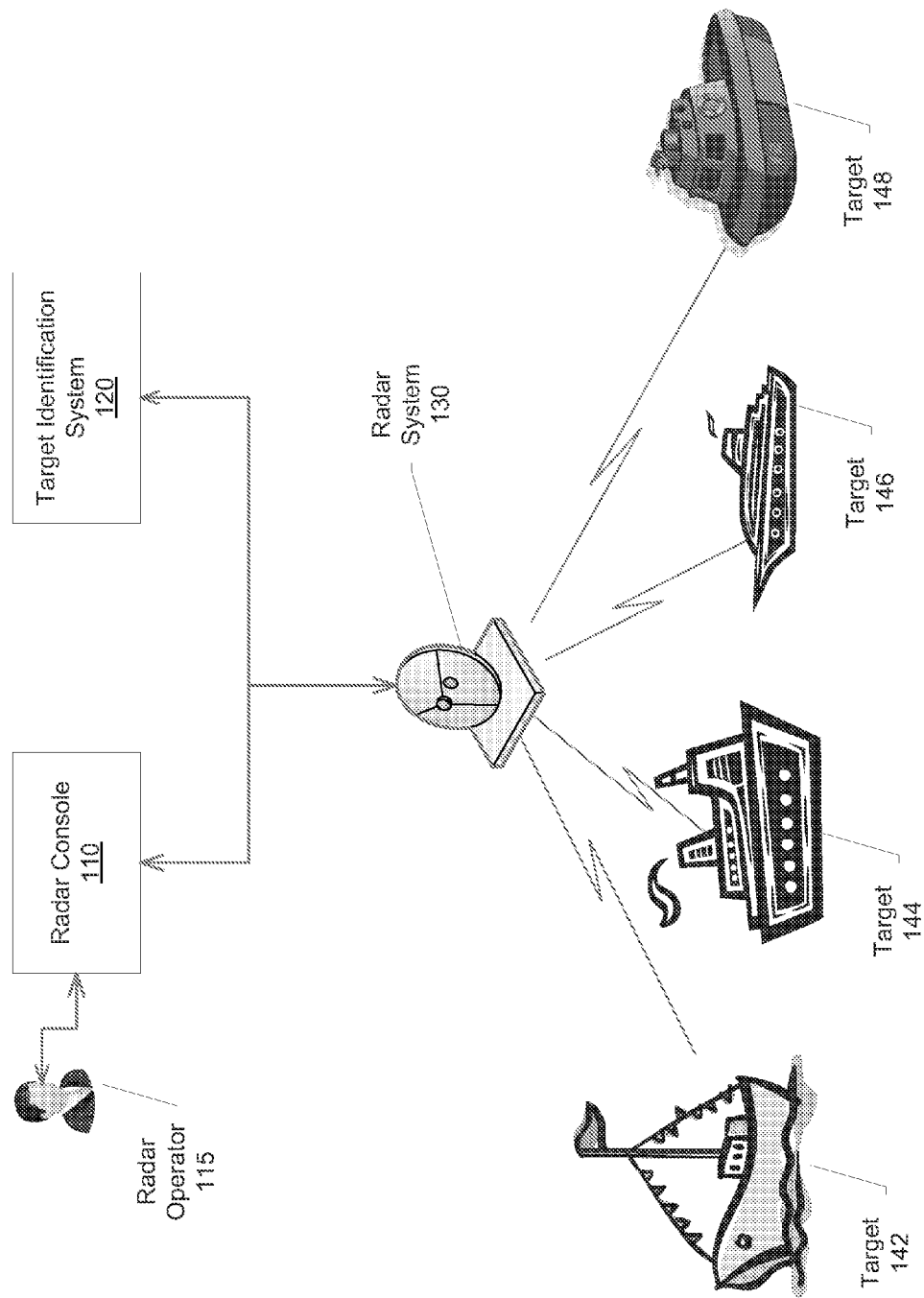
FIG. 1 is a diagram of an exemplary target identification environment.

FIG. 1 is a diagram of an exemplary target identification environment 100. The environment 100 includes a radar console 110, a target identification system 120, and a radar system 130. In operation, a radar operator 115 tracks a plurality of targets 142, 144, 146, and 148 utilizing the system 100. As illustrated in FIG. 1, the plurality of targets 142, 144, 146, and 148 are maritime objects (e.g., a maritime ship, maker buoy, any object identifiable by a radar, etc.). The radar system 130 transmits electromagnetic waves at the target and receives reflections of the electromagnetic waves from the target. The radar system 130 communicates radar data (e.g., high range resolution radar, synthetic aperture radar, inverse synthetic aperture radar, etc.) from the reflections of the electromagnetic waves to the radar console 110 and/or the target identification system 120. The target identification system 120 processes the radar data (e.g., radar image, group of radar images, etc.) to identify one or more targets. Although FIG. 1 illustrates maritime objects as the targets 142, 144, 146, and 148, the target identification system 120 can identify any type of object (e.g., aircraft, vehicle, building, etc.).

Figure 2A:
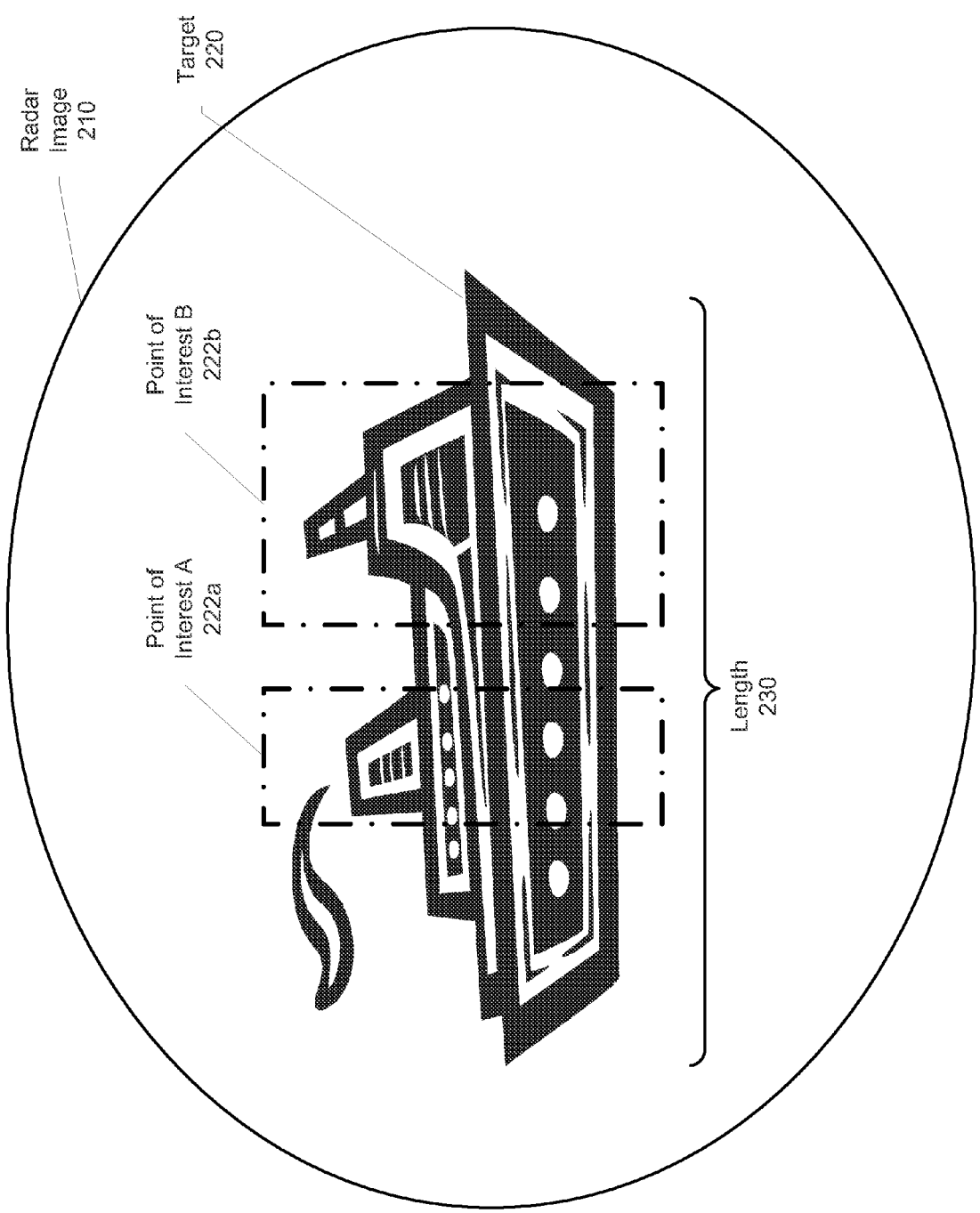
FIGS. 2A-2D are diagrams of exemplary radar images processed by a target identification system.

FIG. 2A is a diagram of an exemplary radar image 210 processed by a target identification system (e.g., the target identification system 120 of FIG. 1). A target 220 (in this example, a maritime vessel) is illustrated within the radar image 210. The target identification system 120 determines a length 230 of the target 220 (e.g., using sum normalized range profile, using Hough line processing, etc.) based on a range profile, the radar image 210, and one or more adaptive parameters. The length 230 of the target 220 enables the technology to winnow the number of possible identification classes and/or enables the technology to focus processor availability on the radar data associated with the target instead of outlying radar data.

The target identification system 120 identifies two points of interest, A 222a (in this example, a smokestack) and B 222b (in this example, a superstructure), based on the length, the range profile, the radar image, and the one or more adaptive parameter. The points of interest, A 222a and B 222b, enable the technology to focus on the differences between the identification classes and identification features, thereby increasing the correct classification rate for the technology. In some examples, the target identification system 120 rotates and/or flips the radar image for consistency of the points of interest identification (e.g., rotate a radar image 180 degrees, rotate a radar image 90 degrees, etc.).

The target identification system 120 determines a target identification (in this example, cruise ship Alpha Tango) from a plurality of identification classes (e.g., cruise ship Alpha Tango, cruise ship Beta Tango, cruise ship Alpha Beta, etc.) based on the length 230 and the points of interest (A 222a and B 222b). Tables 1 and 2 illustrate target identification using length and points of interest, respectively. As illustrated in Tables 1 and 2, the target track identification Track ABC001 is identified as Fishing Trawler BC and the target track identification Track GHA001 is identified as Fishing Trawler CD.

TABLE 1

Exemplary Identification via Length

| Target Track Identification | Target Length | Identification Class | Class Length | Match |
|---|---|---|---|---|
| Track ABC001 | 45 meters | Fishing Trawler AB | 85 meters | No |
| | | Fishing Trawler BC | 45 meters | Yes |
| | | Fishing Trawler CD | 62 meters | No |
| | | Fishing Trawler BD | 46 meters | Yes |
| Track GHA001 | 72 meters | Fishing Trawler AB | 85 meters | Yes |
| | | Fishing Trawler BC | 45 meters | No |
| | | Fishing Trawler CD | 62 meters | Yes |
| | | Fishing Trawler BD | 46 meters | No |

TABLE 2

Exemplary Identification via Points of Interest

| Target Track Identification | Point of Interest | Identification Class | Point of Interest | Match |
|---|---|---|---|---|
| Track ABC001 | Superstructure at 1-9 meters from right side of the target | Fishing Trawler AB | Superstructure at 11-56 meters from left side of the target | No |
| | | Fishing Trawler BC | Superstructure at 1-9 meters from right side of the target | Yes |
| | | Fishing Trawler CD | Superstructure at 11-25 meters from right side of the target | No |
| | | Fishing Trawler BD | Superstructure at 26-56 meters from right side of the target | No |

TABLE 2-continued

Exemplary Identification via Points of Interest

| Target Track Identification | Point of Interest | Identification Class | Point of Interest | Match |
|---|---|---|---|---|
| Track GHA001 | Radio mast at 2 meters from right side of the target | Fishing Trawler AB | Radio mast at 5 meters from right side of the target | No |
| | | Fishing Trawler BC | Radio mast at 8 meters from right side of the target | No |
| | | Fishing Trawler CD | Radio mast at 2 meters from right side of the target | Yes |
| | | Fishing Trawler BD | Radio mast at 11 meters from right side of the target | No |

Figure 2B:
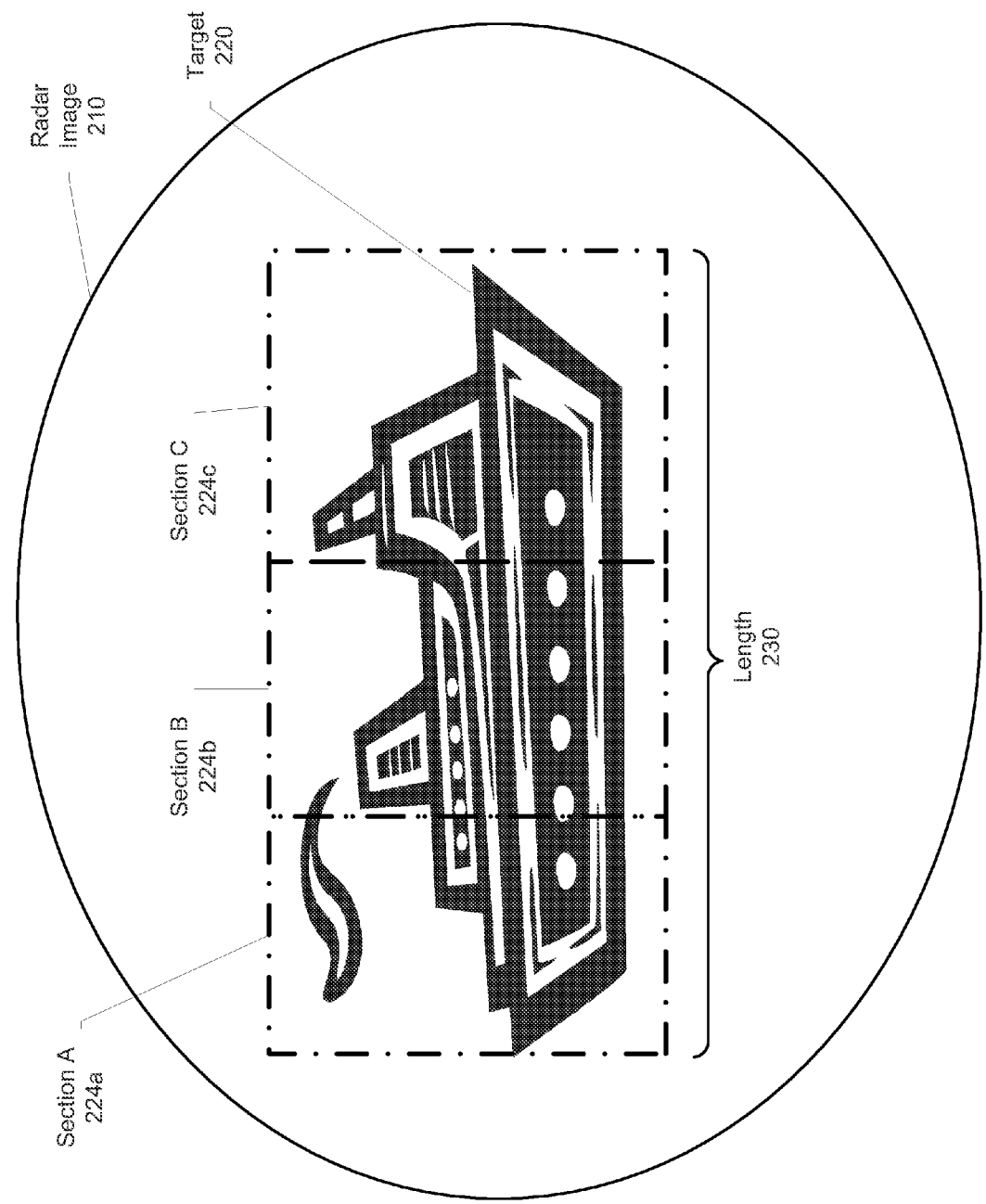

FIG. 2B is a diagram of the exemplary radar image 210 processed by the target identification system 120. As illustrated in FIG. 2B, the target identification system 120 separates the radar image 210 of the target 220 into sections (A 224a, B 224b, and C 224c). The separation of the radar image 210 advantageously enables the target identification system 120 to increase matching points for the identification classes (i.e., an increased number of points of interest for the target).

Figure 2C:
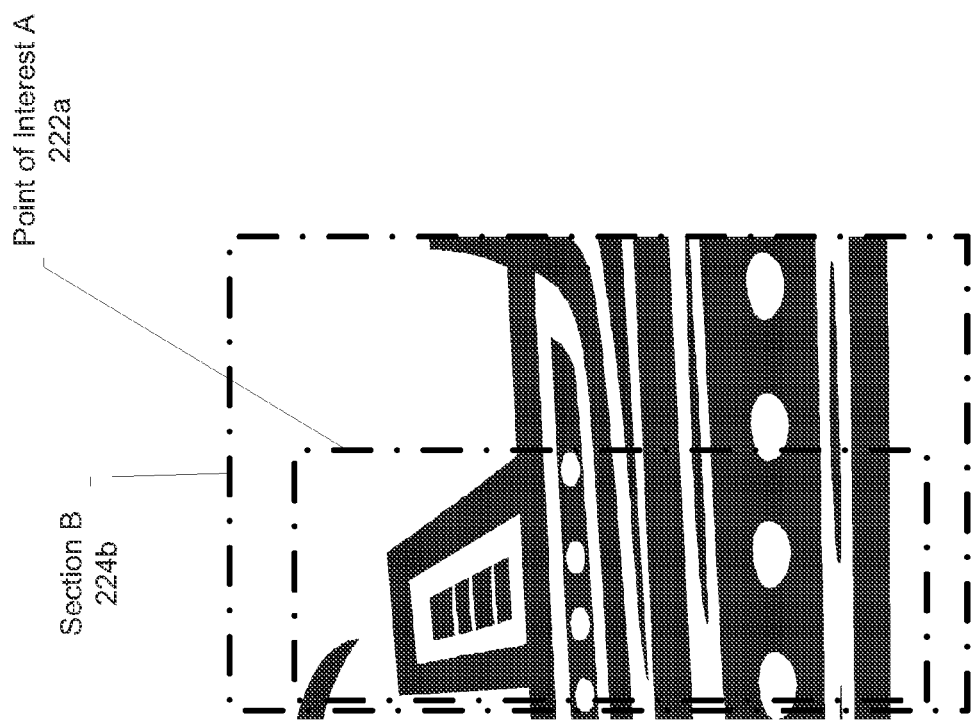

FIG. 2C is a diagram of a portion of the exemplary radar image 210 processed by the target identification system 120. The target identification system 120 identifies the point of interest (A 222a) within the section (B 224b) based on the length, the range profile, the radar image, and the one or more adaptive parameters.

Figure 2D:
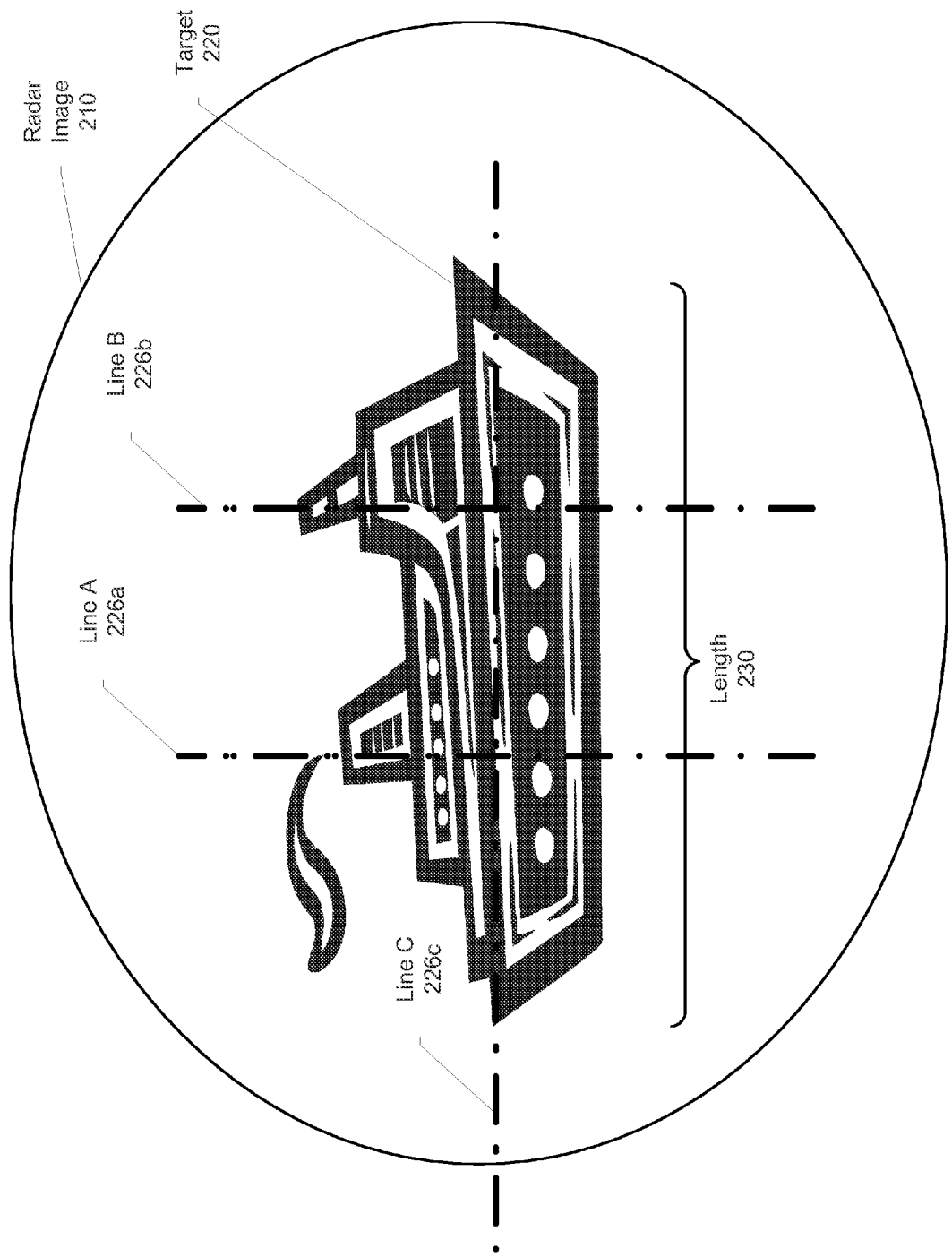

FIG. 2D is a diagram of the exemplary radar image 210 processed by the target identification system 120. The target identification system 120 isolates vertical lines A 226a and B 226b and horizontal line C 226c utilizing the range profile and/or Hough line processing. The determination of vertical lines advantageously enables points of interest (e.g., superstructures, masts, smoke stacks, etc.) to be differentiated from other points of interest (e.g., rotators, reflectors, etc.), by first, the Doppler smearing, and second, the frequency of occurrence when tracked over scan to scan. The determination of horizontal lines advantageously enables a target's platform to be properly identified and/or can be used to refine any initial target length estimate.

Figure 3:
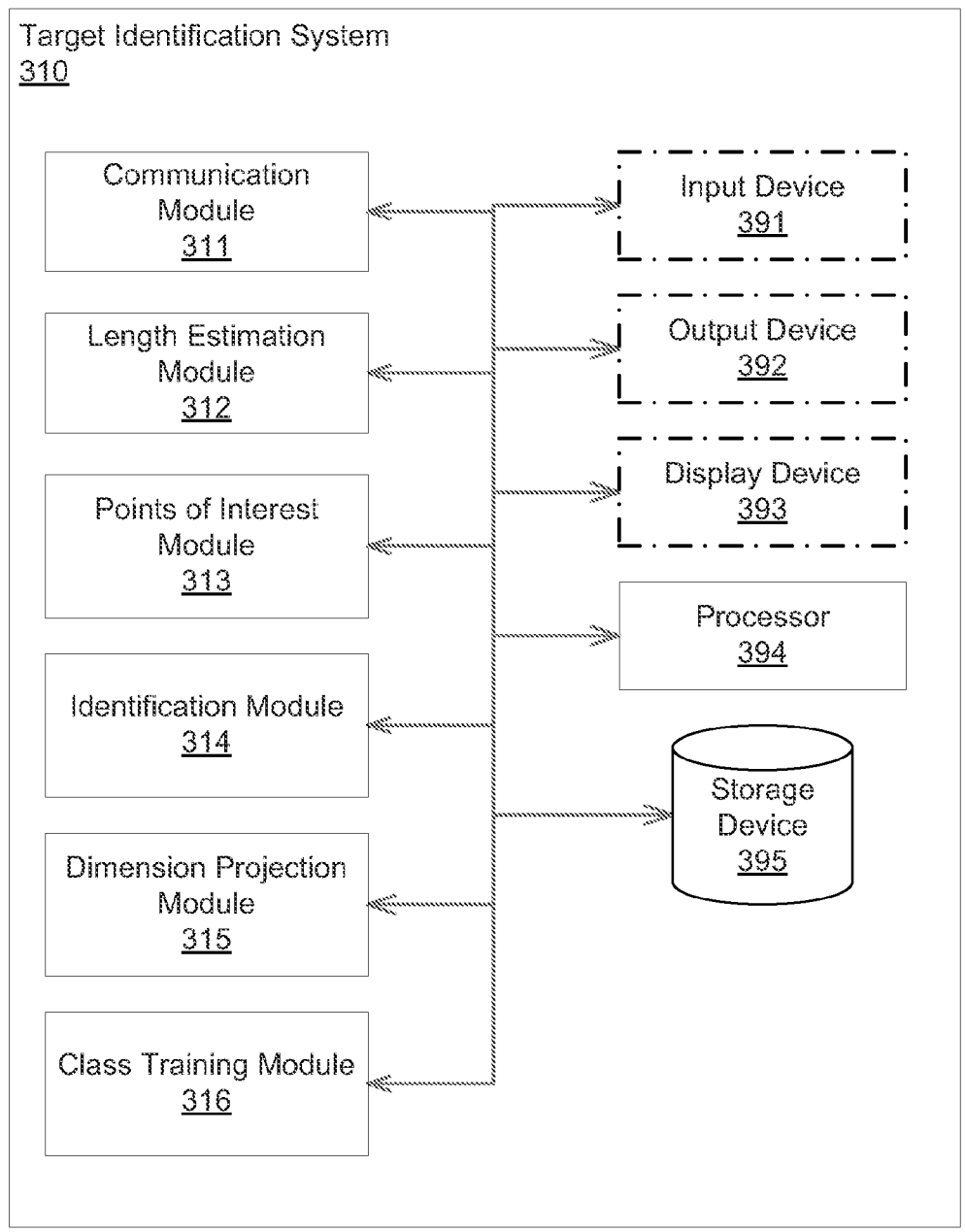
FIG. 3 is a block diagram of an exemplary target identification system.

FIG. 3 is a block diagram of an exemplary target identification system 310. The target identification system 310 includes a communication module 311, a length estimation module 312, a points of interest module 313, an identification module 314, a dimension projection module 315, a class training module 316, an input device 391, an output device 392, a display device 393, a processor 394, and a storage device. The modules and devices described herein can, for example, utilize the processor 394 to execute computer executable instructions and/or include a processor to execute computer executable instructions (e.g., an encryption processing unit, a field programmable gate array processing unit, etc.). It should be understood that the target identification system 310 can include, for example, other modules, devices, and/or processors known in the art and/or varieties of the illustrated modules, devices, and/or processors.

The communication module 311 communicates information to/from the target identification system 310. The length estimation module 312 determines a length of a target (e.g., maritime object, ground object, orbital object, etc.) from a radar image based on a range profile, the radar image (e.g., inverse synthetic aperture radar image, synthetic aperture radar image, high range resolution radar image, un-processed radar data, pre-processed radar data, etc.), and one or more adaptive parameters. The determined length of the target can be used to winnow the number of possible identification classes. For example, the number of possible identification classes includes 212 classes ranging from lengths of 25 meters to 125 meters and based on the determined length of 30 meters, the possible identification classes is winnowed to 35 classes ranging from lengths of 25 meters to 45 meters. The adaptive parameters include an aspect angle parameter (e.g., 66 degrees, 45 degrees, −44 degrees, etc.), a warping coefficient parameter, and/or a point of interest weight parameter (e.g., superstructure=4, reflector=1, etc.). The warping coefficient parameter can be utilized when adjusting apparent length estimates in the range dimension in situations in which the target aspect angle is not favorable for length estimates (e.g., less than −60 degrees, more than 60 degrees, etc.). The warping coefficient parameter advantageously decreases gross underestimation or overestimation of target length due to less favorable target aspect angles. Table 3 illustrates exemplary determined lengths for a plurality of targets.

TABLE 3

Exemplary Lengths

| Target Track Identification | Determined Length | Radar Image Identification | Range Profile | Adaptive Parameters |
|---|---|---|---|---|
| Track ABC001 | 45 meters | Image DEG33 | 10,000 meters | Aspect Angle = +32 degrees; Warping Coefficient = 3 |
| Track D32001 | 25 meters | Image TR342 | 50,000 meters | Aspect Angle = −15 degrees |
| Track A001 | 62 meters | Image IU324 | 100,000 meters | Aspect Angle = −50 degrees; Warping Coefficient = 8 |

The points of interest module 313 identifies at least one point of interest (e.g., radio mast, superstructure, flag mast, radar array, satellite dish, etc.) of the target from the radar image based on the length, the range profile, the radar image, and the one or more adaptive parameters. The point of interest can be any distinguishable part of the target (e.g., turret, height above the water line, type of construction, etc.). In other examples, the points of interest module 313 determines at least one point of interest of the target from the radar image based on the length, the range profile, the radar image, the one or more adaptive parameters, Hough Line processing, and/or horizontal and vertical line isolations. Table 4 illustrates exemplary points of interest for a plurality of targets.

TABLE 4

Exemplary Points of Interest

| Target Track Identification | Determined Length | Point of Interest |
|---|---|---|
| Track ABC001 | 45 meters | Radio Mast at 1/6 from the left side of the target; Superstructure at 1-9 meters from right side of the target; Superstructure at 32-44 meters from left side of the target |
| Track D32001 | 25 meters | Radio Mast at 1/12 from the right side of the target; Superstructure at 10-14 meters from left side of the target |
| Track A001 | 62 meters | Radar Array at 3 meters from the left side of the target; |

TABLE 4-continued

Exemplary Points of Interest

| Target Track Identification | Determined Length | Point of Interest |
|---|---|---|
| | | Satellite Dish at 5 meters from the right side of the target; Superstructure at 12-24 meters from left side of the target |

The identification module 314 determines a target identification from a plurality of identification classes based on the length and the at least one point of interest. Table 5 illustrates exemplary identification classes. Table 6 illustrates exemplary target identifications based on the exemplary identification classes of Table 5.

TABLE 5

Exemplary Identification Classes

| Identification Class | Length | Point of Interest |
|---|---|---|
| Fishing Trawler AB | 85 meters | Radio Mast at 1/8 from the left/right side of the target; Superstructure at 1-9 meters from left/right side of the target; Superstructure at 80-85 meters from right/left side of the target |
| Fishing Trawler BC | 45 meters | Radio Mast at 1/6 from the left/right side of the target; Superstructure at 32-44 meters from left side of the target |
| Fishing Trawler CD | 62 meters | Radar Array at 2 meters from the left/right side of the target; Satellite Dish at 4 meters from the right/left side of the target; Superstructure at 12-24 meters from left side of the target |

TABLE 6

Exemplary Target Identifications

| Target Track Identification | Target Identification |
|---|---|
| Track ABC001 | Fishing Trawler BC |
| Track D32001 | Unknown - No Identification based on Identification Classes |
| Track A001 | Fishing Trawler CD |

The dimension projection module 315 projects 2-dimensional target features of the radar image onto a 1-dimensional target feature vector for the radar image. The 1-dimensional target feature vector includes the target's length, and for each target section, the placement (e.g., in range) of each designated point of interest, with respective designation (e.g., mast, superstructure, rotator, reflector, etc.) and weighting. If more than one point of interest is found in a particular section, the 1-dimensional target feature vector includes the feature with greatest weighting. In other examples, if both points of interest are utilized for distinguishing between classes, the target is separated into more sections as to create range separation amongst those aforementioned points of interest. In some examples, the dimension projection module 315 projects 2-dimensional target features of each of the plurality of pre-identified radar images into a 1-dimensional target feature vector for each of the plurality of pre-identified radar images.

The class training module 316 generates the plurality of identification classes based on a plurality of pre-identified radar images. Each of the plurality of pre-identified radar images includes a pre-identified length and at least one pre-identified point of interest. The pre-identified radar images can be from real-world radar images with real-world data issues such as noise spikes, clutter returns, range and Doppler smearing, and atmospheric confrontations. The class training module 316 can utilize a Gaussian Mixture Model based on a Neural Network and/or any other type of classifier (e.g., Hidden Markov Models, Vector Quantizers, Neural Networks, Radial Basis Functions, etc.) to perform classification training and/or testing. The class training module 316 can utilize expectation maximization and/or any other algorithmically iterative training technique to designate a target with the highest data class probability. Table 3, described above, illustrates exemplary identification classes.

The input device 391 receives information associated with the target identification system 310 (e.g., instructions from a user, instructions from another computing device, etc.) from a user (not shown) and/or another computing system (not shown). The input device 391 can include, for example, a keyboard, a scanner, etc. The output device 392 outputs information associated with the target identification system 310 (e.g., information to a printer (not shown), information to a speaker, etc.).

The display device 393 displays information associated with the target identification system 310 (e.g., status information, configuration information, etc.). The processor 394 executes the operating system and/or any other computer executable instructions for the target identification system 310 (e.g., executes applications, etc.).

The storage device 395 stores radar data and/or target identification data. The storage device 395 can store information and/or any other data associated with the target identification system 310. The storage device 395 can include a plurality of storage devices and/or the target identification system 310 can include a plurality of storage devices (e.g., a radar input storage device, a target identification storage device, a target training storage device, etc.). The storage device 395 can include, for example, long-term storage (e.g., a hard drive, a tape storage device, flash memory, etc.), short-term storage (e.g., a random access memory, a graphics memory, etc.), and/or any other type of computer readable storage.

Figure 4:
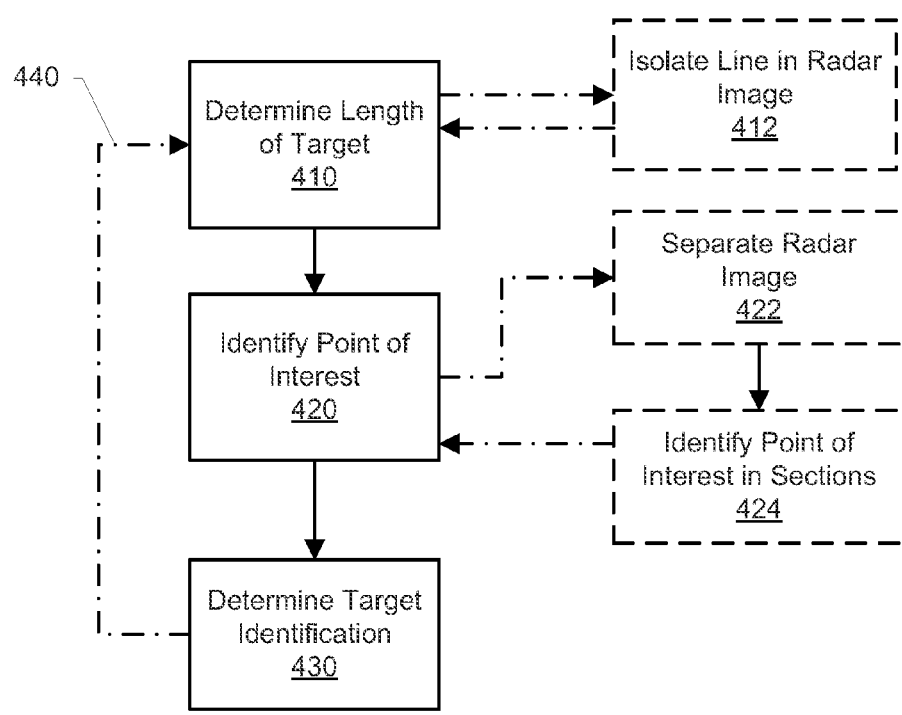
FIG. 4 is a flowchart of an exemplary target identification process.

FIG. 4 is a flowchart of an exemplary target identification process 400 utilizing, for example, the target identification system 310 of FIG. 3. The length estimation module 312 determines (410) a length of a target from a radar image (e.g., an inverse synthetic aperture radar image, a synthetic aperture radar image, etc.) based on a range profile, the radar image, and one or more adaptive parameters. The points of interest module 313 identifies (420) at least one point of interest of the target from the radar image based on the length, the range profile, the radar image, and the one or more adaptive parameters. The identification module 314 determines (430) a target identification from a plurality of identification classes based on the length and the at least one point of interest.

In some examples, the points of interest module 313 separates (422) the radar image into at least two sections based on the length of the target. In other examples, the points of interest module 313 identifies (424) at least one point of interest of the target for at least one of the at least two sections from the radar image based on the range profile, the radar image, and the one or more adaptive parameters. Table 7 illustrates exemplary sections and the corresponding point of interests.

TABLE 7

Exemplary Points of Interest

| Target Track Identification | Section | Point of Interest |
|---|---|---|
| Track GA | A | Superstructure at 1-9 meters from left side of the target |
| | B | Radio Mast at 1/2 from the left side of the target |
| | C | Superstructure at 32-44 meters from left side of the target |
| Track HA | A | Superstructure at 4-45 meters from left side of the target |
| | B | Radio Mast at 60 meters from the left side of the target |
| | C | Superstructure at 100-115 meters from left side of the target |
| | D | Radar Array at 1/100 from right side of the target |

In some examples, the target identification system 310 and/or the associated modules repeat (440) the steps (410, 420, and 430) to determine another target identification for another frame of the radar image. For example, the target identification system identifies a first frame of the radar image as a fishing trawler AB, a second frame of the radar image as a fishing trawler BC, and a third frame of the radar image as the fishing trawler AB. Table 8 illustrates exemplary frames and the corresponding target identifications.

TABLE 8

Exemplary Frames

| Target Track Identification | Frame | Time | Target Identification |
|---|---|---|---|
| Track ABC001 | A | 3:34.12 | Pleasure Boat AB |
| | B | 3:34.22 | Pleasure Boat BC |
| | C | 3:34.32 | Pleasure Boat AB |
| | ... | ... | ... |
| | X | 4:21.22 | Pleasure Boat AB |
| | W | 4:21.42 | Pleasure Boat CD |
| | Z | 4:21.54 | Pleasure Boat AB |
| Track A001 | A | 3:34.23 | Pleasure Boat CD |
| | B | 3:34.24 | Pleasure Boat CD |
| | C | 3:34.35 | Pleasure Boat AB |
| | ... | ... | ... |
| | X | 3:35.12 | Pleasure Boat CD |
| | W | 3:35.13 | Pleasure Boat CD |
| | Z | 3:35.14 | Pleasure Boat CD |

In other examples, the identification module 314 tracks the target identifications from the frames. The display device 393 can display the target identifications to a user (e.g., the radar operator 115). Table 9 illustrates exemplary counts for target tracks.

TABLE 9

Exemplary Counts

| Target Track Identification | Frames | Target Identification | Identification Count |
|---|---|---|---|
| Track ABC001 | 150 | Pleasure Boat AB | 112 |
| | | Pleasure Boat BC | 28 |
| | | Pleasure Boat CD | 10 |
| Track A001 | 450 | Pleasure Boat AB | 17 |
| | | Pleasure Boat BC | 23 |
| | | Pleasure Boat CD | 410 |

In some examples, the identification module 314 determines (430) a target identification from a plurality of identification classes based on the length and the at least one point of interest utilizing a Gaussian Mixture Model (GMM) and/or any other similar technique. The GMM can be based on parameters such as number of mixture components or centers in the model, the type of model (e.g., spherical, square, etc.), and/or the model dimensionality.

In some examples, the length estimation module 312 isolates at least one horizontal or vertical line in the radar image utilizing the range profile and/or Hough line processing. In other examples, the length estimation module 312 compares the vertical lines with the locations of peaks associated with a sum normalized range profile of the radar image and designates any that occur in the same region as points of interest locations.

In other examples, the length of a target is determined in accordance with the following equation:

$$L_{true} = \frac{L_a}{\cos(\theta_{asp})}$$

Whereas:
$L_{true}$=actual length of the target;
$L_a$=apparent length of the target; and
$\theta_{asp}$=angle formed by the radar Line of Sight and the longitudinal angle of the target.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier interne protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A target identification system, the system comprising:
    a length estimation processor configured to determine a length of a target from a radar image based on a sum normalized range profile, the radar image, and one or more adaptive parameters, the length estimation processor further configured to utilize a warping coefficient parameter to adjust the determined length of the target based on an aspect angle of the target;
    a points of interest processor configured to identify at least one point of interest of the target from the radar image based on the length of the target, the sum normalized range profile, the radar image, the one or more adaptive parameters, and Hough Line processing, wherein the points of interest processor identifies the at least one point of interest by separating the radar image into at least two sections based on the length of the target and identifies the at least one point of interest of the target from at least one of the at least two sections; and
    an identification processor configured to determine a target identification from a plurality of identification classes based on the length of the target and the at least one point of interest of the target.

2. The system of claim 1, further comprising:
    a dimension projection processor configured to project 2-dimensional target features of the radar image onto a 1-dimensional target feature vector for the radar image; and
    the points of interest processor further configured to determine at least one point of interest of the target from the radar image based on the length of the target, the sum normalized range profile, the radar image, the one or more adaptive parameters, and Hough Line processing.

3. The system of claim 1, further comprising a class training processor configured to generate the plurality of identification classes based on a plurality of pre-identified radar images, each of the plurality of pre-identified radar images comprises a pre-identified length and at least one pre-identified point of interest.

4. The system of claim 3, further comprising a dimension projection processor configured to project 2-dimensional target features of each of the plurality of pre-identified radar images into a 1-dimensional target feature vector for each of the plurality of pre-identified radar images.

5. The system of claim 1, wherein the target is a maritime object.

6. A method, executed by one or more processors, for target identification of a radar image, the method comprising:
   (a) determining a length of a target from a radar image based on a sum normalized range profile, the radar image, and one or more adaptive parameters and utilizing a warping coefficient parameter to adjust the determined length of the target based on an aspect angle of the target;
   (b) identifying at least one point of interest of the target from the radar image based on the length of the target, the sum normalized range profile, the radar image, the one or more adaptive parameters, and Hough Line processing, wherein identifying the at least one point of interest includes separating the radar image into at least two sections based on the length of the target and identifying the at least one point of interest of the target from at least one of the at least two sections; and
   (c) determining a target identification from a plurality of identification classes based on the length of the target and the at least one point of interest of the target.

7. The method of claim 6, wherein the step (b) further comprising:
   separating the radar image into at least two sections based on the length of the target; and
   identifying at least one point of interest of the target for at least one of the at least two sections from the radar image based on the sum normalized range profile, the radar image, and the one or more adaptive parameters.

8. The method of claim 6, further comprising repeating steps (a), (b), and (c) to determine other target identifications for successive frames of the plurality of radar images.

9. The method of claim 6, further comprising isolating at least one horizontal or vertical line in the radar image utilizing the sum normalized range profile, Hough line processing, or any combination thereof.

10. The method of claim 6, wherein the one or more adaptive parameters comprise an aspect angle parameter, a warping coefficient parameter, a point of interest weight parameter, or any combination thereof.

11. The method of claim 6, wherein the radar image is an inverse synthetic aperture radar image.

12. A non-transitory computer program product, tangibly embodied in non-transitory information carrier, the computer program product including instructions being operable to cause a data processing apparatus to:
   determine a length of a target from a radar image based on a sum normalized range profile, the radar image, and one or more adaptive parameters;
   utilize a warping coefficient parameter to adjust the determined length of the target based on an aspect angle of the target
   identify at least one point of interest of the target from the radar image based on the length of the target, the sum normalized range profile, the radar image, the one or more adaptive parameters, and Hough Line processing, wherein identifying the at least one point of interest includes separating the radar image into at least two sections based on the length of the target and identifying the at least one point of interest of the target from at least one of the at least two sections; and
   determine a target identification from a plurality of identification classes based on the length of the target and the at least one point of interest of the target.

\* \* \* \* \*